US006604146B1

United States Patent
Rempe et al.

(10) Patent No.: US 6,604,146 B1
(45) Date of Patent: Aug. 5, 2003

(54) EFFICIENT INTERNET SERVICE IMPLEMENTATION FOR MESH SATELLITE NETWORKS USING CENTRALIZED ROUTER SERVER FOR DISTRIBUTION OF DESTINATION TABLES

(75) Inventors: Steven P. Rempe, Frederick, MD (US); Ashok K. Rao, Germantown, MD (US); Gokhale D. Shyamsundar, Montgomery Village, MD (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 09/332,971

(22) Filed: Jun. 15, 1999

(51) Int. Cl.⁷ .............................................. G06F 15/173
(52) U.S. Cl. ................. 709/238; 709/230; 709/217; 455/39
(58) Field of Search .................. 709/238, 230, 709/217, 242, 239, 250

(56) References Cited

U.S. PATENT DOCUMENTS

| | | | | |
|---|---|---|---|---|
| 5,490,252 A | * | 2/1996 | Macera et al. ............... 709/200 |
| 5,541,911 A | | 7/1996 | Nilakantan et al. | |
| 5,740,164 A | | 4/1998 | Liron | |
| 5,757,784 A | | 5/1998 | Liebowitz et al. | |
| 5,812,545 A | | 9/1998 | Liebowitz et al. | |
| 5,841,765 A | | 11/1998 | Fielding et al. | |
| 5,848,143 A | | 12/1998 | Andrews et al. | |
| 6,038,594 A | * | 3/2000 | Puente et al. ............... 709/200 |
| 6,085,247 A | * | 7/2000 | Parsons, Jr. et al. ........ 709/227 |
| 6,115,750 A | * | 9/2000 | Dillon et al. ............... 709/235 |
| 6,161,141 A | * | 12/2000 | Dillon ........................ 709/230 |
| 6,205,473 B1 | * | 3/2001 | Thomasson et al. ........ 709/217 |
| 6,262,982 B1 | * | 7/2001 | Donahue et al. ............ 370/352 |
| 6,275,496 B1 | * | 8/2001 | Burns et al. ................. 370/429 |
| 6,289,389 B1 | * | 9/2001 | Kikinis ....................... 709/239 |
| 6,310,893 B1 | * | 10/2001 | Yuan et al. .................. 370/474 |
| 6,317,603 B1 | * | 11/2001 | Allison ....................... 455/456 |
| 6,404,769 B1 | * | 6/2002 | Kapoor ....................... 370/398 |

FOREIGN PATENT DOCUMENTS

| WO | WO 97/25787 | * | 7/1997 | ........... H04B/7/212 |
|---|---|---|---|---|
| WO | WO 98/16046 | * | 4/1998 | |

* cited by examiner

Primary Examiner—Zarni Maung
(74) Attorney, Agent, or Firm—Sughrue Mion, PLLC

(57) ABSTRACT

A centralized route-server architecture permits Internet Protocol (IP) services to be offered over satellite mesh networks. Individual satellite terminals perform forwarding of IP traffic to destination terminals based on routing information provided by the route-server. External routers connecting to terminals exchange OSPF and BGP routing protocol packets only with the central route-server.

10 Claims, 2 Drawing Sheets

EFFICIENT INTERNET SERVICE IMPLEMENTATION FOR MESH SATELLITE NETWORKS USING CENTRALIZED ROUTER SERVER FOR DISTRIBUTION OF DESTINATION TABLES

BACKGROUND OF INVENTION

Mesh satellite networks can be used to interconnect sites with traffic destined for several locations. These networks offer single-satellite-hop connectivity in contrast to hub/spoke type networks where all traffic is first sent to a hub and then re-distributed to the destination. Time Division Multiple Access (TDMA), Single Channel Per Carrier (SCPC)-Demand Assigned Multiple Access (DAMA), and Code Division Multiple Access (CDMA) schemes are commonly used for mesh networks. Packet switched services such as X.25, Frame-relay, or ATM have been offered in mesh networks using Virtual Circuits (VCs) between sites which need to exchange information. These Layer-2 protocols have been used to carry IP, IPX, SNA and other higher layer protocol traffic. Partial or full mesh connectivity using VC-based Layer-2 protocols requires multiple virtual circuits and significant resources are required for setup and management of these virtual circuits. This can be avoided if IP services were offered in a native fashion in the mesh satellite network. IP packets will be routed to the appropriate destination using information available in IP packet header (typically the 32 bit destination address). For interoperability with the terrestrial IP infrastructure, standard IP routing protocols will need to be supported by the satellite network. These routing protocols basically consist of messages exchanged between routers which provide connectivity information (i.e. the next hop information for incoming IP packets) and help determine the state of the interconnecting links.

The most straightforward technique for enabling IP services in a mesh satellite network would be to incorporate routing capabilities into each terminal. A packet-switched satellite terminal typically has one or more terrestrial interfaces (such as X.25, frame-relay, ATM, or ethernet) and a single physical satellite interface. The satellite interface can be used to communicate with one, many, or all of the terminals in the network depending on the beam connectivity and available bandwidth on the satellite. Since routing messages are typically exchanged between a router and all of its adjacent neighbors, the terminal/router would need to periodically communicate with all of the terminal/routers in the mesh thereby using up precious bandwidth. Modifications to RIP-2 and OSPF, the most commonly used Interior Gateway Protocols have been suggested to minimize routing traffic for on-demand networks (e.g., J. Moy, "Extending OSPF to support demand circuits", RFC 1793, April 1995), but these modifications are not widely implemented. In addition, supporting routing protocols such as Open Shortest Path First (OSPF) and Boundary Gateway Protocol (BGP) can take up significant CPU and memory resources. In many cases, large routing tables need to be maintained which would consume several megabytes of memory. Further, significant effort may be required to port and test routing protocol software.

A "route server" has been proposed for Multiprotocol over ATM (MPOA) transport in terrestrial ATM networks, as described in Multiprotocol over ATM (MPOA) v1.0 ATM Forum Specification af-mpoa-0087.000, July 1997, available at http://www.atmforum.com/atmforum/specs/approved.html, but has never been proposed for use in connection with satellite networks. In terrestrial ATM networks, there is no pressing need to minimize bandwidth usage between terminals (edge devices in MPOA terminology) and the route server, and the specific techniques disclosed in this reference would not be practical in connection with a meshed satellite network.

SUMMARY OF INVENTION

It is, therefore, an object of the present invention to provide a bandwidth-efficient technique for routing IP traffic over meshed satellite networks.

This and other objects are achieved according to the present invention by a system architecture wherein routing protocols run in a centralized route server (implemented on a standard UNIX workstation). In this architecture, the satellite network is part of a router fabric, with terminals appearing as ports attached to the router core (the route-server). External routers will establish routing sessions only with route-server and not with other terminals. Routing packets originated by an external router attached to a terminal will be conveyed transparently to the route-server. Forwarding (Next-hop) information will be provided by the route-server to all terminals. This information will be used to create a forwarding table in each terminal. The destination of an IP packet will be looked up in the forwarding table, and the IP packet will be sent to the destination if a connection with spare bandwidth exists to the destination terminal. If no connection exists, then the packets will be queued up until the connection is created and bandwidth is allocated, or sent over a fixed broadcast contention-based channel until the dedicated connection is established.

Implementing the route-server on a workstation provides enough CPU and memory resources to run common routing protocols and store large routing tables. The route-server can be easily upgraded with more memory and extra processing power in many cases. Many implementations of routing protocols exist for UNIX, so the porting and testing time is no longer an issue.

The invention minimizes the CPU and memory resources required at the end terminals to support IP routing protocols, and reduces the satellite bandwidth required to support full mesh IP routing packets. By supporting native IP services, the effort required to configure and manage partial or full mesh networks is minimized.

BRIEF DESCRIPTION OF THE DRAWING

The invention will be more clearly understood from the following description in conjunction with the accompanying drawing, wherein.

DETAILED DESCRIPTION OF THE INVENTION

Figure 1:
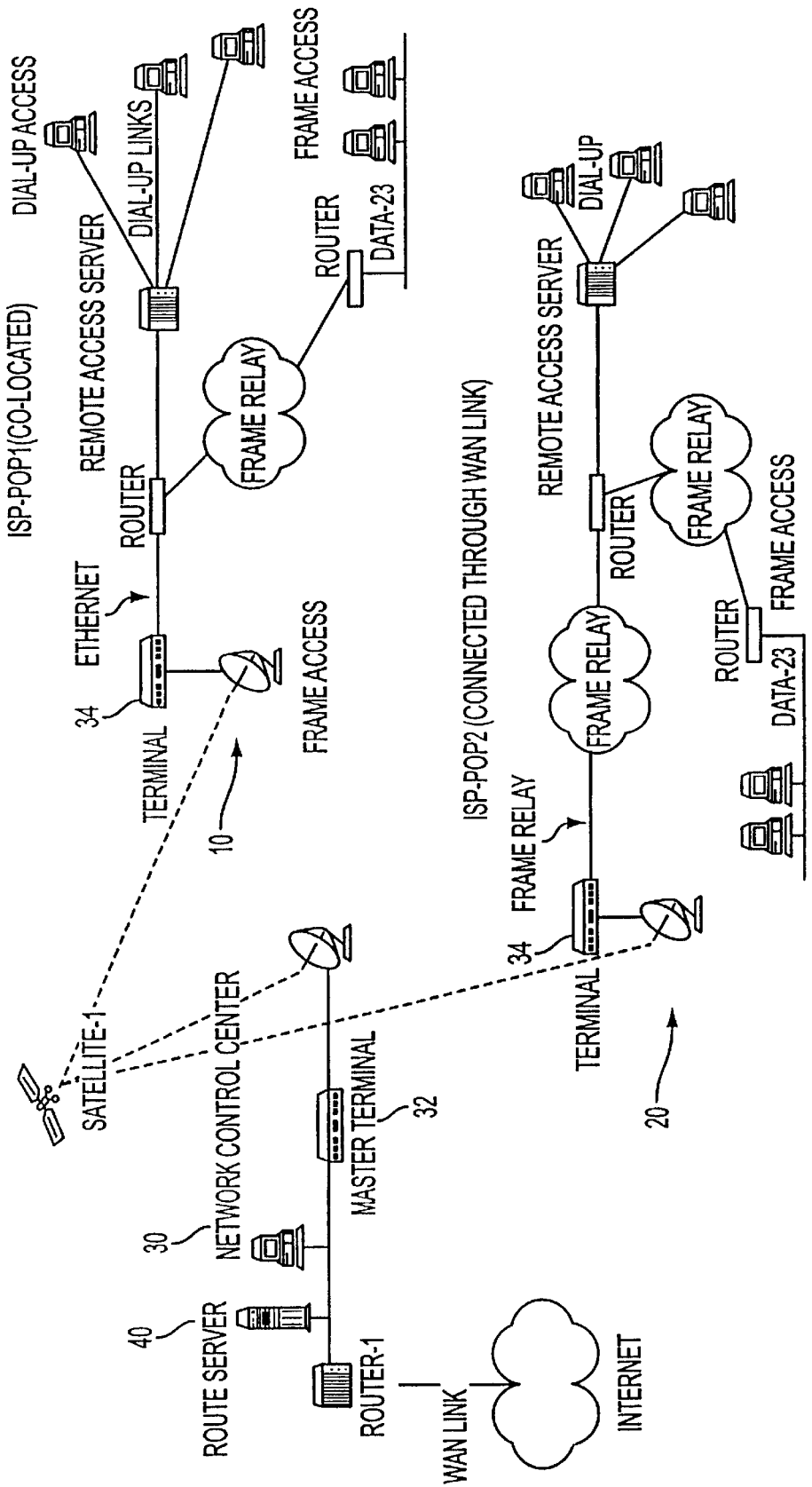
FIG. 1 is a diagram of a mesh satellite network supporting IP services in accordance with the present invention.
Figure 2:
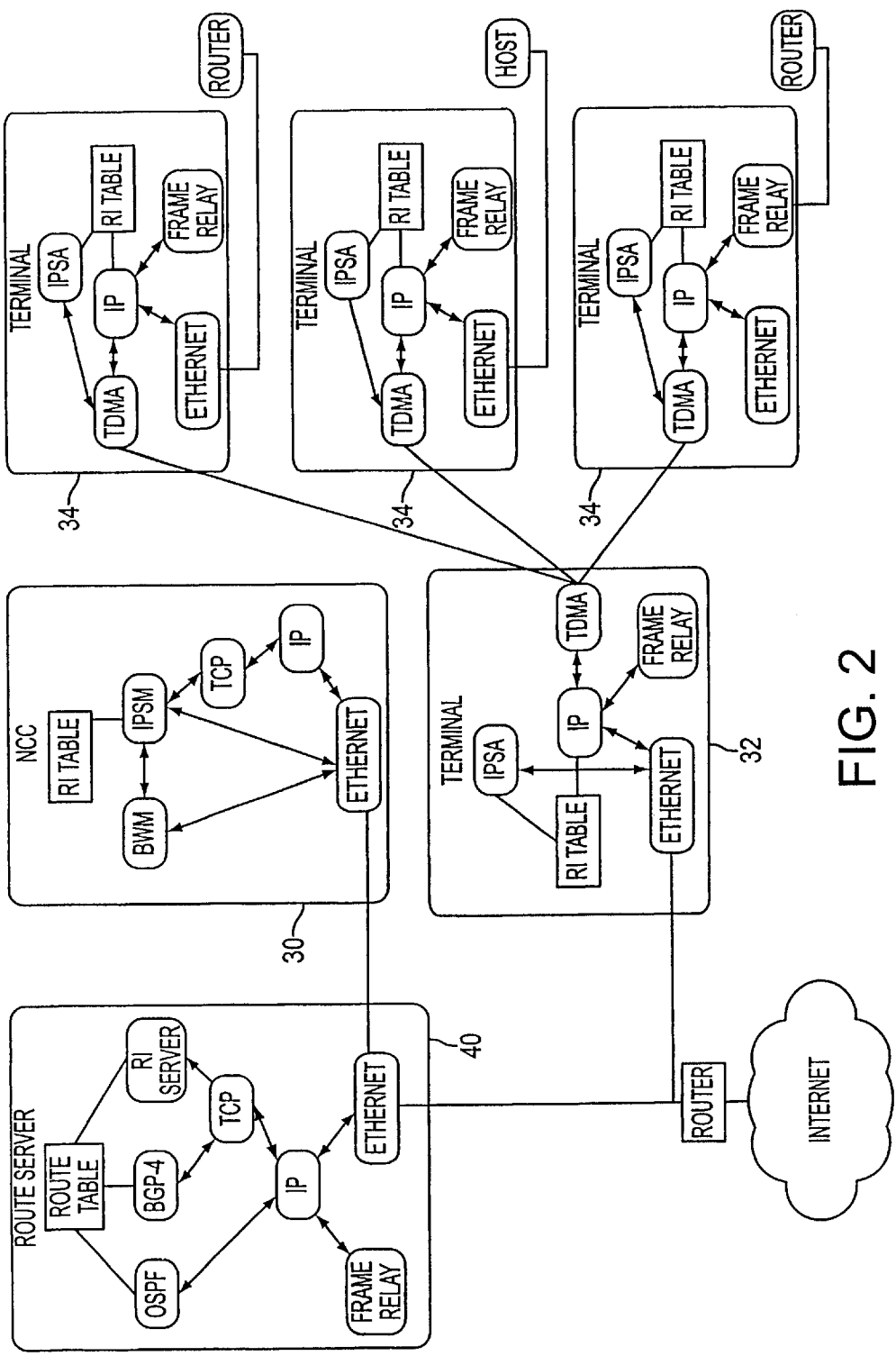
FIG. 2 is a diagram illustrating the various modules in each of the subsystems 30, 32, 34 and 40 in FIG. 1.

An end-to-end network configuration which supports IP services over a mesh satellite network is shown in FIG. 1. In this network, routing information is exchanged between each terminal and the master terminal only, and this exchange is illustrated in FIG. 2, but it will be appreciated that the IP traffic itself routed/forwarded in accordance with the routing information stored at each station, is exchanged directly between stations in a fully meshed manner. Also, while the router associated with the master terminal is illustrated as being connected to the Internet, it will be understood that the routers connected to other stations in FIG. 2 are also connected to the Internet, although this is not shown for the sake of simplifying the drawing.

Such a network can be used to provide connectivity to Internet Service Providers, e.g., 10 and 20, or can be used to connect corporate sites. The network control center (NCC) 30 is located at one site and it is typically a workstation which runs software responsible for configuring, controlling and monitoring the entire network of satellite terminals. The terminal 32 at that site is like any other terminal 34 in the network, but is referred to as the master terminal for clarity. Such a network configuration is typical of most mesh satellite networks. An addition to the normal network configuration is the route-server (RS) 40. The RS computer is on the same Local Area Network (LAN) as the NCC 30 and the master terminal 32.

IP packets which arrive on a terrestrial interface at a terminal need to be forwarded to the appropriate destination terminal from where they would be forwarded on to the terrestrial network. The entry terminal, therefore, needs to look at the destination address of the IP packet and map that to a destination terminal. The route server 40 and NCC 30 work together in creating these map tables using the normal IP routing tables which are maintained at the RS 40. The NCC 30 is responsible for distributing this information to each terminal. If no connection exists to the destination terminal, then the entry terminal makes a request to the NCC 30 for a satellite connection to the destination. The connection could consist of a burst allocation as in TDMA or a specific carrier in the case of SCPC-DAMA. Packets will be queued at the terminal until the connection is established (typically a second or less) and thereafter will be sent using that connection. Alternatively, packets can be sent right away on a fixed broadcast contention-based channel until the dedicated connection is established. If traffic to a destination terminal increases, the entry terminal can make a request to the NCC 30 for more bandwidth. For networks in which traffic flows are fairly well defined, IP circuits with predetermined amounts of minimum bandwidth can be preconfigured and thereafter bandwidth could be increased based on demand.

A view of the various modules responsible for providing IP service is shown in FIG. 2. FIG. 2 shows a master terminal 32 and three other terminals 34, all communicating using TMDA. Other embodiments of this invention could use SCPC (fixed links between terminals), SCPC-DAMA (links are brought up and down based on traffic demands) or CDMA. An explanation for the various modules in each of the sub-systems shown in FIG. 2 is now provided Route-Server (RS)

The RS 40 is implemented with conventional IP routing software which provides support for Exterior Gateway protocols like BGP-4 and Interior Gateway Protocols like OSPF. External routers establish connections with the RS (TCP connection in the case of BGP-4 and IP in the case of OSPF) to exchange routing information and keep-alive messages. Virtual IP subnets are used to connect external routers. Certain routing protocols, such as OSPF, require that adjacent routers be on the same IP subnet and the virtual IP subnet provides the extension of the IP subnet across the satellite network.

The Routing Information Server (RI server) within the RS 40 accepts a TCP connection from the NCC 30 and provides routing information to the IP Service Manager (IPSM) in the NCC 30 on request or whenever additions/deletions occur. The information could consist of the entire routing table or just the changes. The RS 40 can also filter the routes it has learned from the external Internet and provide only the relevant information to the IPSA (IP Service Agent).

The RS 40 also provides IP forwarding service. If any remote terminal does not how to send a packet which arrives on its terrestrial interface, it can forward it to the master terminal which will send it on to the RS 40. Since the RS 40 maintains a full routing table, it can route the packet appropriately and then issue an update for the RI table in the NCC 30.

NCC

The IPSM is the key IP component of the NCC 30. The IPSM initiates and maintains a TCP connection to the RI Server. The RI Server provides the IPSM with Routing Information from the Route Server Route Database, or Route Table. The IPSM will request the entire Route Table at startup. The RIS will send updates whenever the Route Server's Route Database changes. The IPSM also interacts with the Bandwidth Manager (BWM) to provide bandwidth allocation for guaranteed and on-demand service between IP terminals.

The IPSM provides connection management for terminals participating in IP service and distributes Route Information to all IP service terminals. It interfaces to the IP Service Agent (IPSA) in each terminal. The interface between the IPSM and the IPSA is message based. The messages are transferred via the Packet Transport Service utilizing a reliable transport protocol for a unicast and a datagram protocol for broadcast service. There are three basic message types—Route Information, Resync Request and Interface Status. The Route Information message is typically originated by the IPSM and distributed to each IPSA within the network to report network routing information. The Resync Request message is sent by the IPSA to the IPSM to report a loss of synchronization between their respective Route Tables. The IPSM will download the entire Route Table to the IPSA via the reliable transport protocol in response to this message. The Interface Status messages are used by the IPSA to report the state of the terminal interfaces which provide IP service. The IPSM will make Bandwidth allocation/de-allocation decisions based on the reported state of these interfaces.

The IPSM distributes the route information to the IP Service Agent in each IP terminal. When a terminal first comes on line and connects to the IPSM, the entire Routing Information Table is transferred via the reliable transport connection to the terminal. When the IPSM receives an Update message from the RIS it will broadcast an Update message to all terminals via the broadcast service thereby conserving satellite bandwidth. Each broadcast Update message will also have a sequence number. The IPSM will increment the sequence number every time it broadcasts a new update message. It will resend the last update message every N seconds (typically 30 seconds) if there are no additional update messages to send. The terminal will retain the last received sequence number and compare each received sequence number to detect loss of synchronization between it's Route Table and the IPSM Route Table (RI Table). When a loss of synchronization is detected by the terminal it will send a Resync Request message to the IPSM.

When the IPSM receives an interface down message or the reliable transport connection to a terminal fails, the IPSM will broadcast Route Information messages for the affected terminal interface with the Route State set to Down. When the terminals receive a Route Information message with the Route State set to down, they will update their forwarding tables to inhibit IP forwarding to the downed next hop terminal. When the routing protocols at the Route Server detect the topology change, they will update the Route Table which will result in an RIS Route Information message being sent to the IPSM. The IPSM will then broadcast its Route Information message advertising the new next hop for the affected network addresses. When the connection or interface state comes back online, the IPSM will send a Route Information message with the Route State set to up.

Terminal

The key IP component of the terminal is the IP Service Agent. The IPSA provides the route lookup, virtual IP subnet and forwarding of IP packets via the satellite network. It is responsible for configuring the IP service at the Traffic Terminal. It is also responsible for adding and deleting virtual IP-satellite circuits from the terminal to other terminals based on instructions from the NCC. The IPSA initiates and maintains a reliable transport connection with the IPSM at the NCC. This link is used to report interface state changes for each interface configured for IP service. The IPSA receives Route Information messages from the IPSM either over the TTP connection or as broadcast messages sent via TDP. It constructs and maintains the IP RI table based on the contents of the Routing Information Messages. This table is used to provide the route lookup for IP forwarding.

An important component of the IPSA is the bridge function wherein routing packets originated by external routers are sent on to the master terminal/route-server without further IP processing. These routing packets can be easily identified since their destination IP address is the route server's IP address.

The RS 40, IPSM, and IPSA thus work together to create forwarding tables which ensure that packets arriving at a terminal are forwarded to the appropriate destination with minimum satellite hops and minimum queuing delay.

It will be appreciated that various changes and modifications may be made to the embodiments disclosed above without departing from the spirit and scope of the invention as defined in the appended claims.

What is claimed is:

1. A system for offering Internet Protocol (IP) services over satellite networks, said system comprising a plurality of satellite stations communicating with one another via said satellite network, each station storing routing information and using said routing information to route IP traffic to others of said plurality of stations via said satellite network, wherein one of said stations includes a route server for centrally establishing and maintaining routing information for others of said plurality of satellite stations, and a controller for disseminating said routing information to others of said stations for their storage and use in routing IP traffic.

2. A system according to claim 1, wherein said route server establishes and maintains said routing information through exchanges with routers connected via said satellite stations.

3. A system according to claim 2, wherein routing packets originated by said routers are conveyed transparently to said route server by the satellite stations.

4. A system according to claim 2, wherein the route server computes a forwarding table for each satellite station based on information sent from said routers.

5. A system according to claim 1, wherein each station maintains a forwarding table derived from routing information obtained at each station from said route server.

6. A system according to claim 5, wherein each router connected to a station exchanges routing information only with said route server, with IP packets being sent from the routers connected to said one station to routers connected to any other station in accordance with the content of the forwarding table at said each station.

7. A system according to claim 5, wherein said controller at said one station includes a master forwarding table containing information for each of said other stations.

8. A system according to claim 7, wherein said route server is adapted to receive IP packets from one of said other stations, forward said IP packets to another of said other stations in accordance with said master forwarding table, and send routing information to said one of said other stations for use in future forwarding of IP packets destined for said another of said other stations.

9. A system according to claim 1, wherein said route server communicates with said routers via Open Shortest Path Forwarding (OSPF) routing protocol.

10. A system according to claim 1, wherein said route server communicates with said routers via Border Gateway Protocol-4 (BGP-4) routing protocol.

* * * * *